United States Patent
Pai et al.

(10) Patent No.: US 11,582,579 B2
(45) Date of Patent: Feb. 14, 2023

(54) SECURE STREAMING OF REAL-TIME LOCATION DATA BETWEEN ELECTRONIC DEVICES

(71) Applicant: Apple Inc., Cupertino, CA (US)

(72) Inventors: Raghunandan K. Pai, Saratoga, CA (US); Michael C. Laster, Santa Clara, CA (US); Scott Lopatin, San Francisco, CA (US); Tommy Rochette, San Jose, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 16/586,184

(22) Filed: Sep. 27, 2019

(65) Prior Publication Data

US 2020/0107165 A1 Apr. 2, 2020

Related U.S. Application Data

(60) Provisional application No. 62/738,986, filed on Sep. 28, 2018.

(51) Int. Cl.
| | |
|---|---|
| *H04W 4/029* | (2018.01) |
| *H04W 4/02* | (2018.01) |
| *H04W 4/70* | (2018.01) |
| *H04W 12/06* | (2021.01) |
| *H04L 9/08* | (2006.01) |
| *G01S 5/02* | (2010.01) |
| *H04W 12/033* | (2021.01) |
| *H04W 12/0471* | (2021.01) |

(52) U.S. Cl.
CPC ........... *H04W 4/029* (2018.02); *G01S 5/0284* (2013.01); *H04L 9/0894* (2013.01); *H04W 4/027* (2013.01); *H04W 4/70* (2018.02); *H04W 12/033* (2021.01); *H04W 12/0471* (2021.01); *H04W 12/06* (2013.01)

(58) Field of Classification Search
CPC ....... H04W 4/029; H04W 4/027; H04W 4/70; H04W 12/0471; H04W 12/033; H04W 12/06; H04L 9/0894; G01S 5/0284
See application file for complete search history.

(56) References Cited

U.S. PATENT DOCUMENTS

| | | | |
|---|---|---|---|
| 6,993,350 | B2 | 1/2006 | Katoh |
| 7,039,427 | B2 | 5/2006 | Tachikawa |
| 7,519,377 | B2 | 4/2009 | Tsukamoto |
| 8,971,924 | B2 | 3/2015 | Pai et al. |
| 9,104,896 | B2 | 8/2015 | Pai et al. |
| 9,456,298 | B2 | 9/2016 | Lee et al. |
| 9,485,177 | B2 | 11/2016 | Tung et al. |

(Continued)

*Primary Examiner* — Rhonda L Murphy
(74) *Attorney, Agent, or Firm* — Aikin & Gallant, LLP

(57) ABSTRACT

Embodiments described herein provide for system and methods to enable the secure streaming of real-time location data between electronic devices. One embodiment provides for a non-transitory machine-readable medium storing instructions to perform operations comprising creating record to specify a location streaming relationship between a first device registered with a first user account and a second device registered with a second online account, the record including a secret key. The record is stored to an online datastore and shared between the first user account and the second online account. The location data stream can be encrypted using the secret key stored in the record.

20 Claims, 15 Drawing Sheets

(56) References Cited

U.S. PATENT DOCUMENTS

| | | |
|---|---|---|
| 9,706,032 B2 | 7/2017 | Pai et al. |
| 2015/0350119 A1 | 12/2015 | Thirumalai et al. |
| 2015/0350140 A1 | 12/2015 | Garcia et al. |
| 2017/0070506 A1* | 3/2017 | Reddy ................. G06F 21/56 |
| 2019/0149945 A1* | 5/2019 | Chheda ................ G08G 1/202 |
| | | 709/206 |
| 2019/0215182 A1* | 7/2019 | Lee ..................... H04W 4/023 |
| 2020/0082113 A1* | 3/2020 | Van Liesdonk ..... G06F 21/6227 |

* cited by examiner

SECURE STREAMING OF REAL-TIME LOCATION DATA BETWEEN ELECTRONIC DEVICES

CROSS-REFERENCE

This application claims benefit of United States provisional patent application having Ser. No. 62/738,986, filed on Sep. 28, 2019, which is hereby incorporated herein by reference.

FIELD

Embodiments described herein relate generally to remote communication between electronic devices, and more specifically to enabling the secure streaming of real-time location data between electronic devices.

BACKGROUND OF THE DESCRIPTION

Mobile devices can determine their geographic location by using a built-in global position system (GPS) antenna or extrapolating the device's location from radio frequency signals received through fixed-location cellular antennas or nearby Wi-Fi access pointers. A user of the mobile device can use the location determining features of the device to determine his or her location. A mobile device user may wish to have friends or family members know of his or her location and likewise, he or she may wish to know the location of his or her friends or family members. Existing mechanisms for relaying location data use a server-based mechanism in which the respective locations for multiple devices are synced with a server. However, server-based techniques may be limited in the frequency of location updates, reducing the accuracy of relayed data.

SUMMARY OF THE DESCRIPTION

Embodiments described herein provide for system and methods to enable the secure streaming of real-time location data between electronic devices. The secure streaming is facilitated via records that are securely shared via a cloud datastore. One embodiment provides for a non-transitory machine-readable medium storing instructions which, when executed, cause one or more processors of a data processing system to perform operations comprising creating record to specify a location streaming relationship between a first device registered with a first user account and a second device registered with a second online account, the record including a secret key, storing the record to an online datastore associated with the first online account, establishing a share for the record via the online datastore, the share established with the second online account, generating a set of keys at the first device, the set of keys generated based on the secret key, and sending a message from the first device to the second device to establish a location data stream, the location data stream encrypted by the second device using keys generated based on the secret key.

One embodiment provides for an electronic device comprising a wireless radio system coupled to a bus, a memory to store instructions, and one or more processors to execute the instructions. The instructions cause the one or more processors to receive a request to share a location of the electronic device with a receiving electronic device, decrypt and read an encrypted record including information to establish a network connection with the receiving electronic device, the record read from a cache of an online data store, wherein the record includes a secret key, establish a data stream with the receiving electronic device using the information, the data stream established via the wireless radio system, determine a location for the electronic device via a location determination service, and transmit the location for the electronic device via the data stream, the location encrypted using a key derived from the secret key.

One embodiment provides for a data processing system comprising a non-transitory machine-readable medium to store instructions and one or more processors to execute the instructions. The instructions cause the one or more processors to perform operations comprising creating record to specify a location streaming relationship between a first device registered with a first user account and a second device registered with a second online account, the record including a secret key, storing the record to an online datastore associated with the first online account, sharing an encrypted version of the record via the online datastore, the encrypted version of the record shared with the second online account, generating a set of keys at the first device, the set of keys generated based on the secret key, sending a message from the first device to the second device to establish a location data stream, the location data stream encrypted by the second device using one or more keys in the set of keys, and displaying a location received from the location data stream on a graphical interface of the first device.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
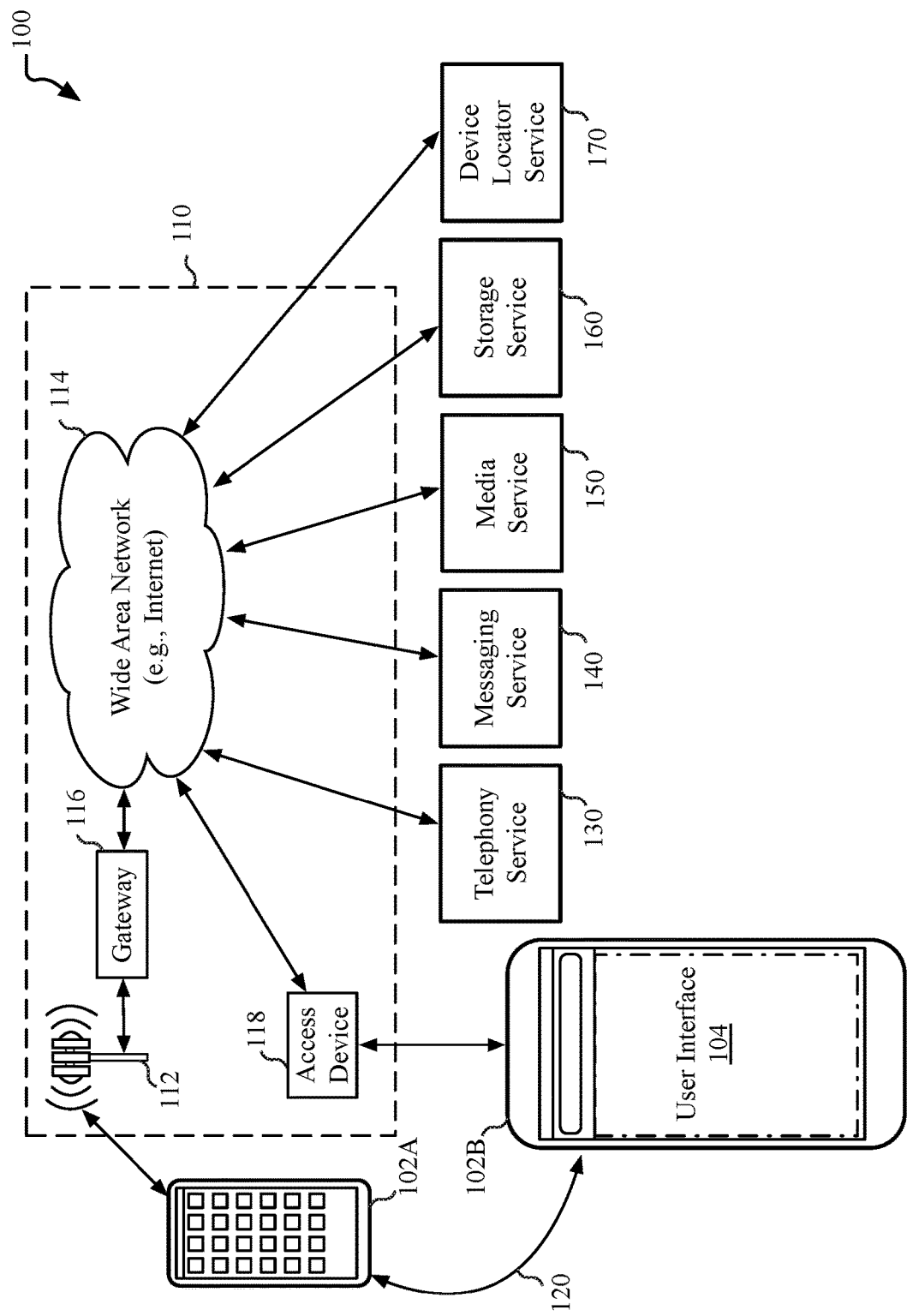
FIG. 1 is a block diagram of a network operating environment for mobile devices, according to an embodiment.

Embodiments described herein provide techniques to enable the secure streaming of real-time location data between electronic devices. The secure streaming is facilitated via records that are securely shared via a cloud datastore. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a network. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to send location data for a mobile device of the user to other users that are connected over the one or more wires or wireless networks 110.

Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B. The mobile devices 102A-102B can also access other data and content over the one or more wired and/or wireless networks 110. For example, content publishers, such as news sites, RSS feeds, web sites, blogs, social networking sites, developer networks, etc., can be accessed via a web browser as described herein. Mobile device 102A and/or mobile device 102B can execute browser software to access web sites provided by servers accessible via the wide area network 114.

In one embodiment the device locator service 170 can enable a user of a mobile device, for example, mobile device 102B, to establish a secure channel to enable the streaming of location data for the mobile device of the users at other mobile devices, such as mobile device 102A. Once the secure channel is established, a user at a mobile device (e.g., mobile device 102B or mobile device 102A) can optionally enable the streaming of real-time location data to mobile devices of other users.

While mobile devices are illustrated and described herein, features of some embodiments are not limited to mobile devices. Other applicable devices include laptop or desktop devices and can additionally include some wearable accessories, such as but not limited to a smart watch device or a wearable display.

Figure 2A:
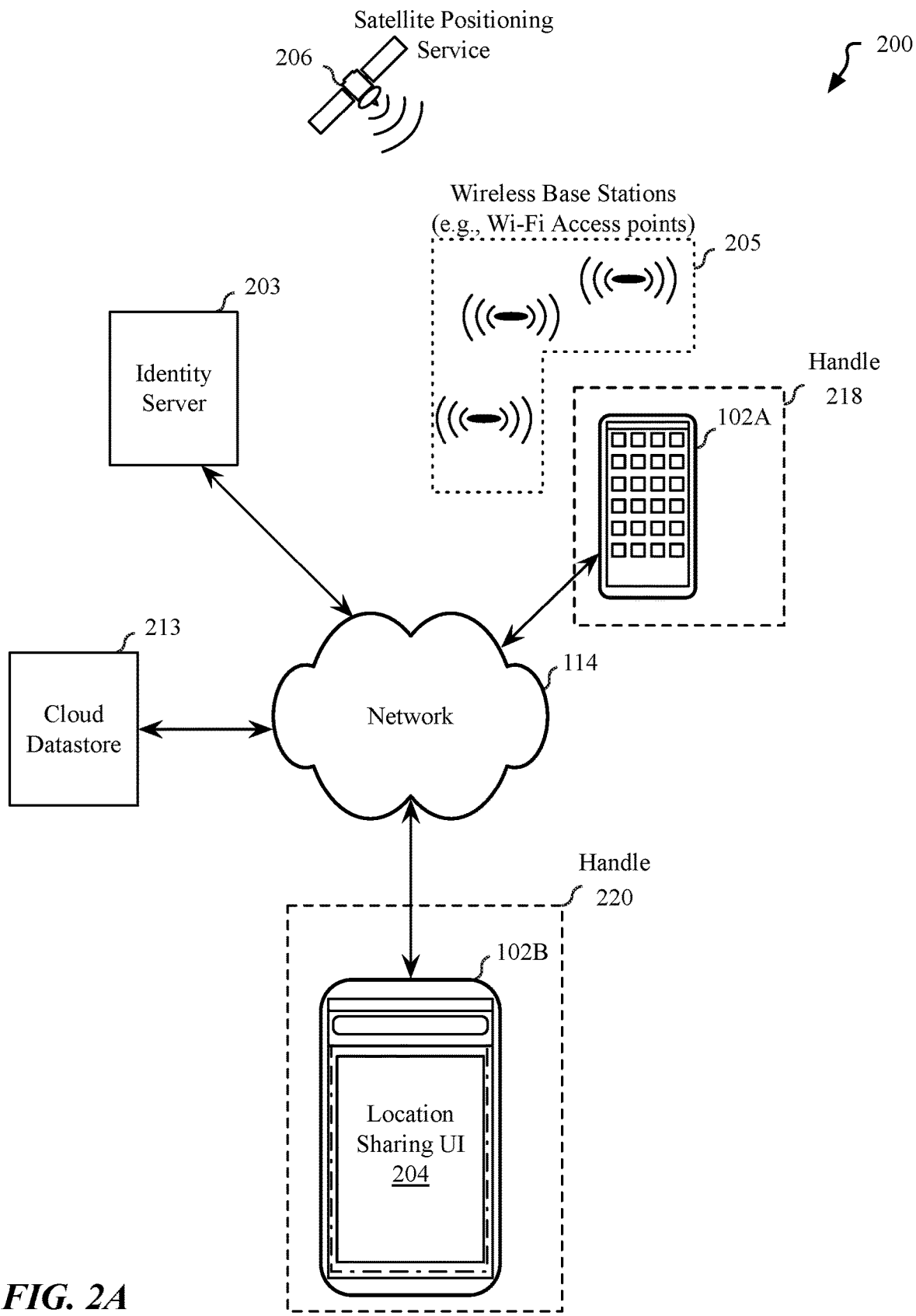
FIG. 2A-2B illustrates a system and method to enable location determination and sharing for a mobile device, according to embodiments.
Figure 2B:
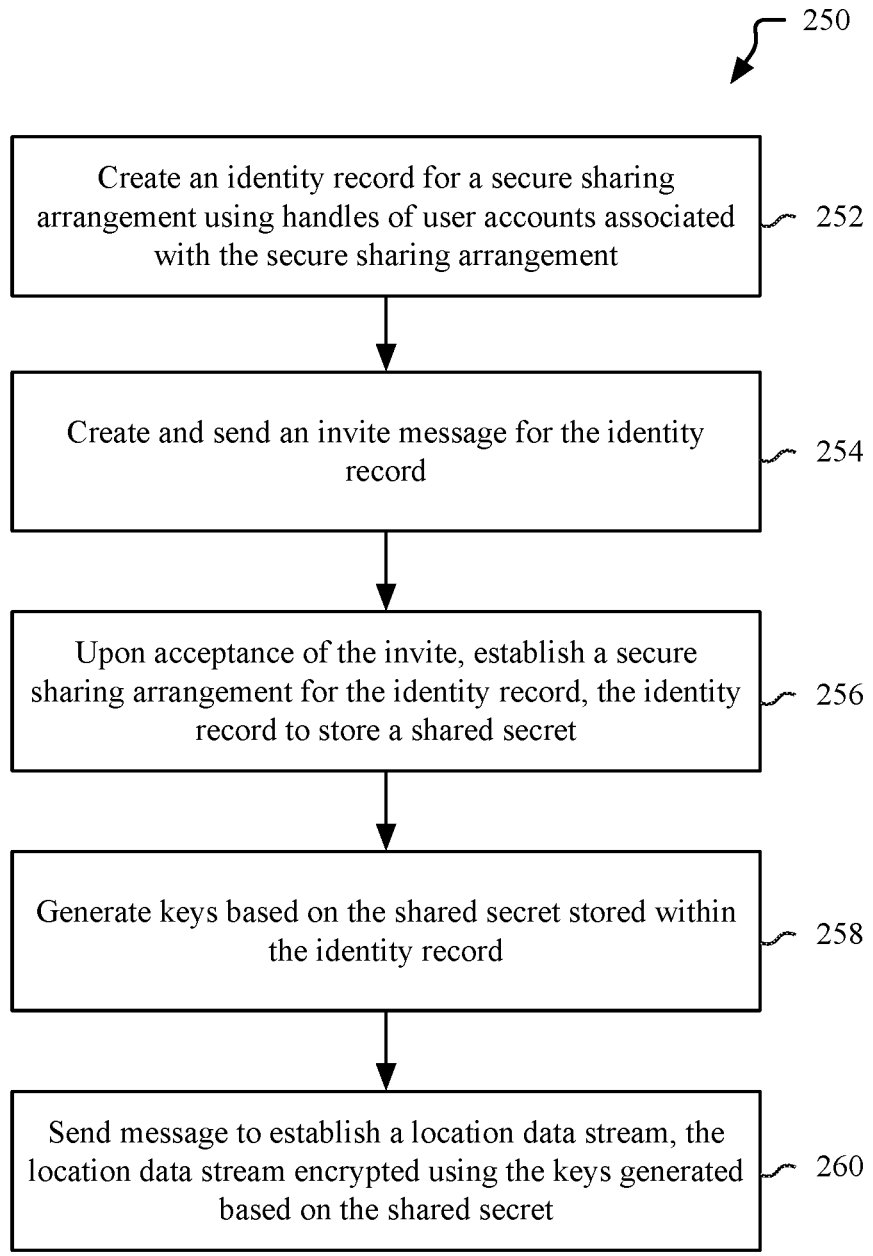

FIG. 2A-2B illustrates a system and method to enable location determination and sharing for a mobile device, according to embodiments. FIG. 2A illustrates a system 200 to enable location determination and sharing for a mobile device. FIG. 2B illustrates a method 250 to establish a secure data channel over which location data can be streamed. The method 250 of FIG. 2B can be implemented using elements of the system 200 of FIG. 2A.

As shown in FIG. 2A, the system 200 includes an identity server 203 and a cloud datastore 213 in communication with multiple mobile devices 102A-102B over a wide area network 114. The system 200 enables mobile device 102A and mobile device 102B to establish a secure sharing relationship that enables the authentication of an identity that specifies a relationship between multiple user accounts. The identity is then securely shared between the accounts. The securely shared identity can store a shared secret that can be used by the devices to generate cryptographic material to secure a data channel over which location data can be streamed.

The identity server 203 is one or more networked server devices that provide services related to acquiring information relating to users and/or user accounts. In one embodiment, when mobile device 102A or mobile device 102B start up and connect to the wide area network 114, the devices can register with an identity management infrastructure that includes the identity server 203 to receive an encrypted identification token for the device. The identification token can be based on one or more user or account identifiers and a unique entity or device identifier, which can be combined to generate an entity or device token that at least quasi-uniquely identifies each device. The identification token can be used by the mobile devices 102A-102B to register for various services provided via the identity management infrastructure. The identification token for each device can be associated with an online user account associated with the device.

In one embodiment, mobile devices 102A-102B can communicate via a channel established by or routed through the identity server 203. For example, the mobile devices 102A-102B can send device information request messages to the identity server 203 to acquire information to enable the transmission of messages to one or more electronic devices associated with a handle. A handle is an email address, a phone number, and/or another piece of information that can be used to identify a user or to identify an account associated with a user. For example, an account used by mobile device 102A can have handle 218, while the account at mobile device 102B can have handle 220. Using the handle associated with a user or user account, a mobile device can acquire information, such as a push token, that allows the mobile device to contact the set of mobile devices associated with the handle. In one embodiment, the identity server 203 can also act as a relay for message between the mobile devices 102A-102B.

The cloud datastore 213 is a remote storage location that can be used to store data on behalf of the mobile devices 102A-102B. The cloud datastore 213 can be a server, a network addressed storage location, a collection of computing devices, or can be part of a cloud storage system that presents virtualized network storage. An identity can be created that represents the location sharing stream. The identity can be stored on the cloud datastore 213 and securely shared between the mobile devices 102A-102B. Using the identity, a location data stream can then be established that allows a location sharing device to stream real-time location updates to a receiving device.

A user at mobile device 102B, via a location sharing UI 204, can invite a user at mobile device 102A, via the identity server 203, to share the location determined for mobile device 102A with mobile device 102B. If the user at mobile device 102A accepts the invitation, a secure relationship between mobile device 102A and mobile device 102B can be established via an identity record stored on the cloud datastore 213. The secure relationship can be used to enable mobile device 102A to stream real-time location data to mobile device 102B. The location of mobile device 102A can then be displayed via the location sharing UI 204, with real-time updates sent each time a location update is determined at mobile device 102A. The real-time location data can then be on the location sharing UI 204 of mobile device 102B. Mobile device 102A can determine its location using one or more location and/or positioning services including, but not limited to a satellite positioning service 206 or a terrestrial positioning system using RF signals received from wireless base stations 205 such as Wi-Fi access points or cell tower transmitters of a cellular telephone network.

In an embodiment, mobile device 102A can periodically store a cached location determined based on the one or more location and/or positioning services. When location streaming begins, mobile device 102A can initially send a cached location, then begin streaming real-time location data once an updated location can be determined. Location data streaming can be initiated when, having established a secure sharing relationship, a user at a mobile device (e.g., mobile device 102B) launches the location sharing UI 204. Real-time streaming of location data can be performed when the streaming mobile device (e.g., mobile device 102A) is moving and the location data is being updated. Location data can be streamed as location data updates are determined at the streaming device and can be ceased when the streaming device is no longer moving or the user at the receiving mobile device stops using the location sharing UI 204.

The real-time location data can be streamed over one of a variety of data channels. A dedicated location streaming channel can be used or existing data channels available to the mobile devices 102A-102B can be re-purposed to stream location data. In one embodiment, a voice-over-IP (VOIP) data channel is used to stream encrypted location data instead of encrypted voice data, although other peer-to-peer data channels available to the mobile devices 102A-102B can be used. For example, location data can be shared via a peer-to-peer messenger data channel and at least temporarily displayed using a peer-to-peer messenger application.

The location data is streamed in a peer-to-peer manner to avoid delays and throttling that may be associated with a server-based data channel. While the location data is transmitted in a peer-to-peer manner, in one embodiment the initiation of a sharing session is performed through the identity server 203, with the maintenance and updating of the credentials associated with the secure sharing relationship performed using the cloud datastore 213. In one embodiment, instead of a peer-to-peer connection, data can be relayed through the identity server 203, for example, if one or more of the devices cannot establish a direct, peer-to-peer network connection.

As shown in FIG. 2B, method 250 enables mobile devices to establish a secure data channel over which location data can be streamed. In one embodiment, method 250 includes for an inviting device (e.g., mobile device 102A or mobile device 102B) to create an identity record for a secure sharing arrangement established via the cloud datastore 213 using handles of user accounts associated with the secure sharing arrangement (block 252). The identity record is a "strong" identity, in that the identity record securely identifies the participants in the secure sharing arrangement. The identity record can be stored on the cloud datastore 213 and securely shared using a secure sharing mechanism enabled via the cloud datastore. The sharing mechanism enables online accounts that participate in the secure sharing arrangement to access encrypted versions of the shared record. The accounts that participate in the secure sharing arrangement can encrypt and decrypt the record using keys generated based on a shared secret that is established between the user accounts that participate in the secure sharing arrangement.

The inviting device can then create and send an invite message for the identity (block 254). The invite message can include identifying information for the identity, including the handles associated with the identity and a message payload that identifies the message as an invite message. In one embodiment the invite message can additionally include a signature that can be used to authenticate the message. The signature can be based on cryptographic material that is unique to the online user account associated with the sending user. Upon authentication and acceptance of the invite by the invitee, a secure sharing arrangement for the identity record can be established between devices associated with the identity record (block 256). The identity record is used to store a shared secret, which will be the basis for credentials used to encrypt data and messages associated with the identity record. The identity record is shared between multiple user accounts, allowing users associated with the user accounts to access the shared secret. Each device associated with the share can generate keys based on the shared secret stored within the identity record (block 258). A user that is authorized to view a location of another user can send a message to establish a location data stream, where the location data stream is encrypted using keys generated based on the shared secret (block 260).

Additional details on the cloud data store and the secure sharing API are provided by FIG. 3 through FIG. 7, and their associated descriptions, which are found below.

Figure 3:
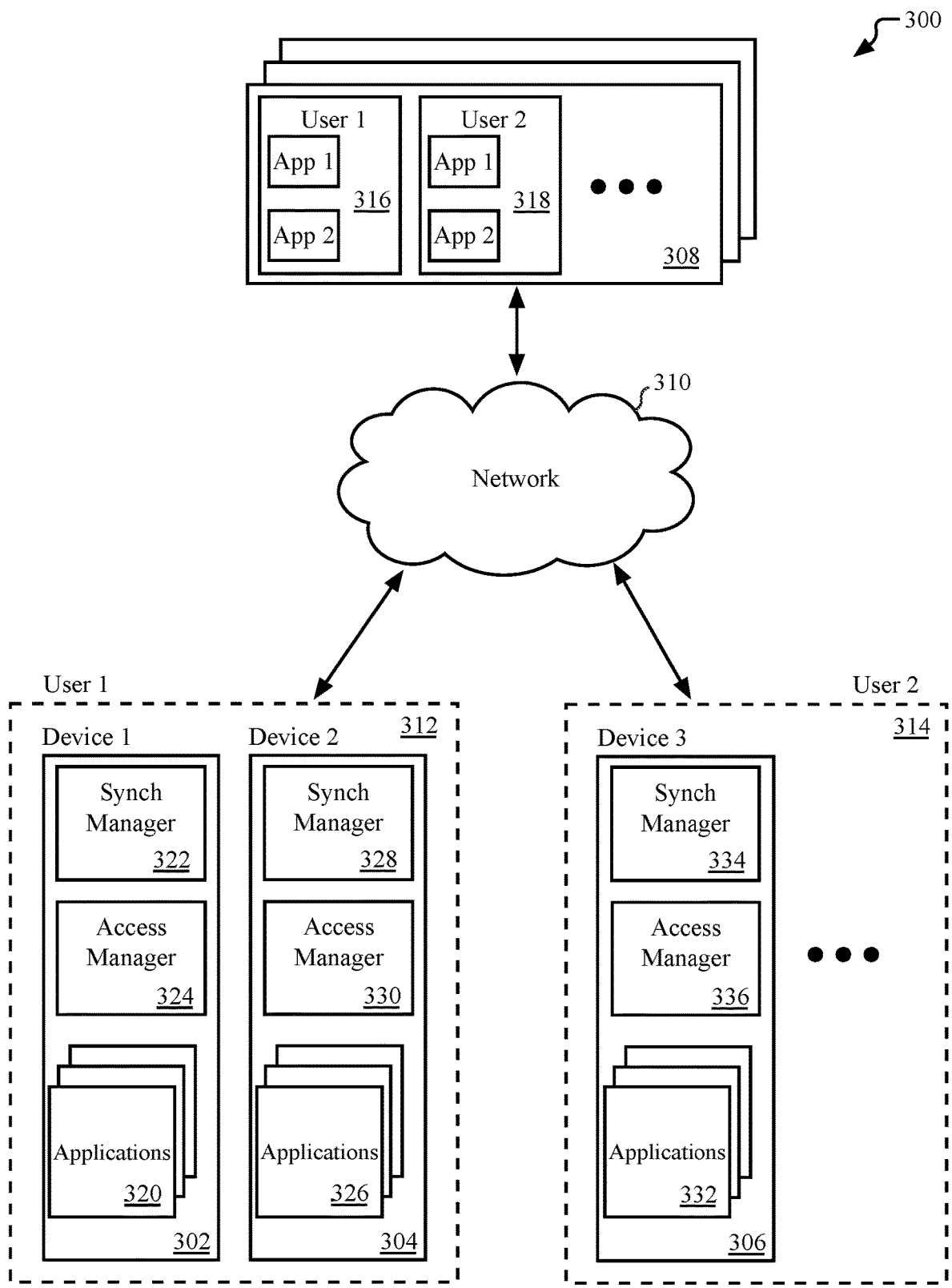
FIG. 3 is a diagram illustrating a system for securely storing data items, according to an embodiment.

FIG. 3 is a diagram illustrating a system 300 for securely storing data items, according to an embodiment. The system 300 includes a first device 302, a second device 304, a third device 306, and a remote storage location 308. The first device 302, second device 304, third device 306, and remote storage location 308 are communicatively coupled together using one or more networks 310. The one or more networks 310 can include both wired and wireless networks. The network 310 can be, for example, part of a local area network, or a wide area network (e.g., wide area network 114), such as the Internet. The system 300 can be used to enable devices to share identity records that include a secret that is used to encrypt data within a data stream.

The first device 302, second device 304, and third device 306 can each be similar to, for example, mobile device 102A or mobile device 102B, but are not limited to mobile devices. The first device 302, the second device 304, and the third device 306 can include, for example, desktop or laptop computing devices, mobile devices, tablet devices, personal data assistants, wearable devices, or other computing devices. Each of the first device 302 and the second device 304 can be associated with a first user or user account 312. Similarly, the third device 306, and one or more other devices not shown can be associated with a second user or user account 314. The remote storage location 308 can additionally be coupled to many other devices that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example, a key or device identifier for the first device 302 and second device 304 can be associated with a key or account identifier for user or user account 312. A key or device identifier for the third device 306 can be associated with a key or user account identifier for user or user account 314. Such association can be used to enable authenticated access to account-based storage on the remote storage location 308.

The remote storage location 308 can be a single storage location or multiple storage locations. For example, a server, a network addressed storage location, a collection of computing devices, or as part of a cloud storage system presenting virtualized network storage.

The remote storage location 308 includes separate logical containers for storing data from different users/user accounts and application combinations. In some examples, a logical container could be a directory in a file system, a data structure, a database, or another kind of data organizational unit. For example, the first user or user account 312 can have containers 316 on the remote storage location 308, one for each individual application associated with the user or user account. Similarly, the second user or user account 314 can have containers 318 for respective applications. Application data items received from individual devices (e.g., the first device 302) are stored in respective containers for that application. The remote storage location 308 can include a storage manager that can create and manage containers as well as generate notifications for devices.

The first device 302 includes one or more applications 320, a synchronization manager 322, and an access manager 324. The one or more applications 320 can include various types of applications such as productivity applications, system applications, games, etc. Each application can be associated with a unique key or other identifier that can be used to identify the application and to identify particular access permissions of that application. In some implementations, one or more application 320 is sandboxed such that it is isolated from each other application.

The synchronization manager 322 manages sending data items to the remote storage location 308 and receiving information (e.g., data items or notifications) from the remote storage location 308. The access manager 324 presents available data items to particular applications of the applications 320 in response to a query from the respective applications. The access manager 324 applies one or more access policies to determine what data items will be visible to a particular application of the applications 320.

The second device 304 similarly includes one or more applications 326, a synchronization manager 328, and an access manager 330. The applications 320 and application 326 can include one or more of the same applications. The third device 306 similarly includes one or more applications 332, a synchronization manager 334, and an access manager 336.

Figure 4A:
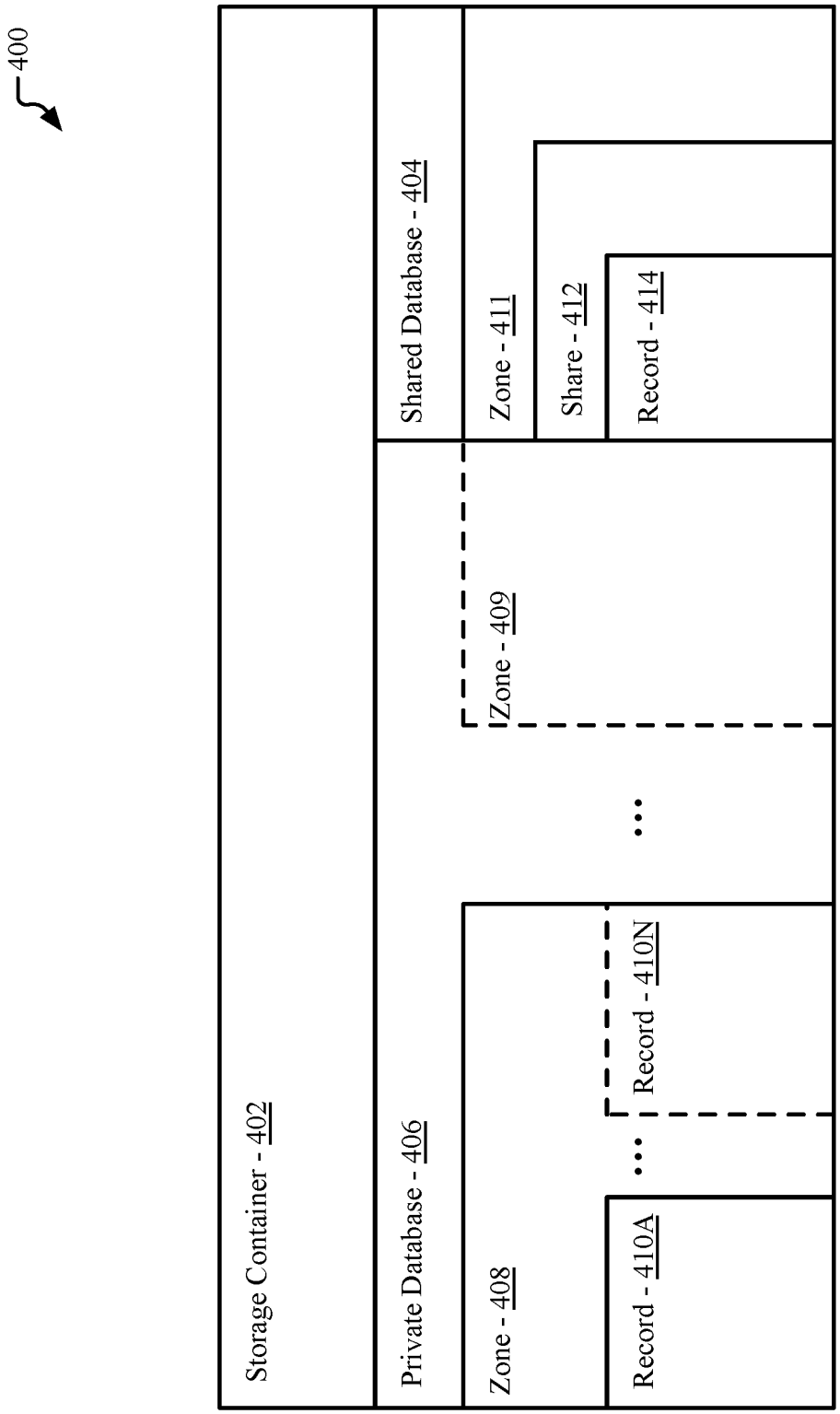
FIG. 4A-4D illustrate systems and methods to enable secure streaming of location data between devices, according to embodiments.
Figure 4B:
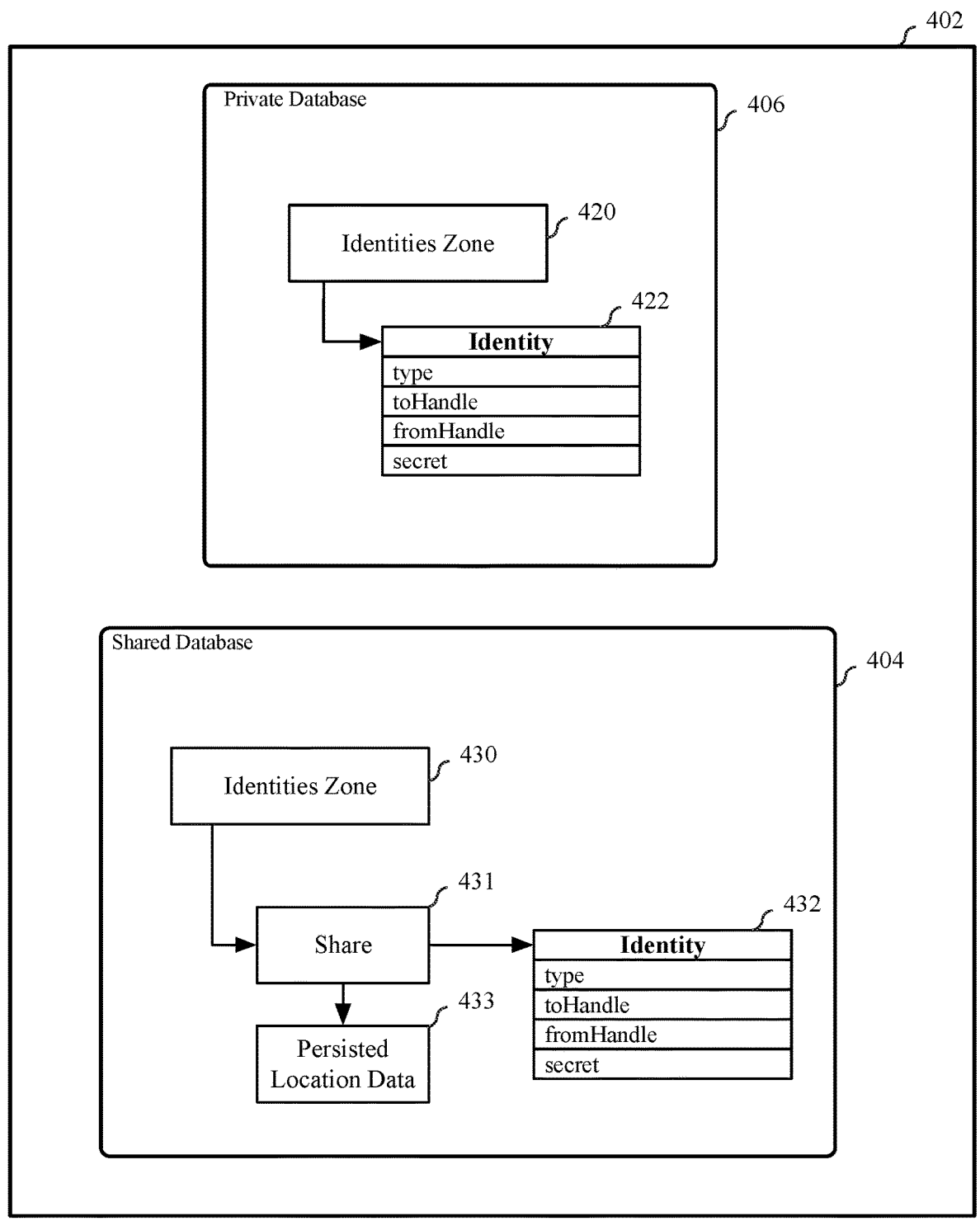
Figure 4C:
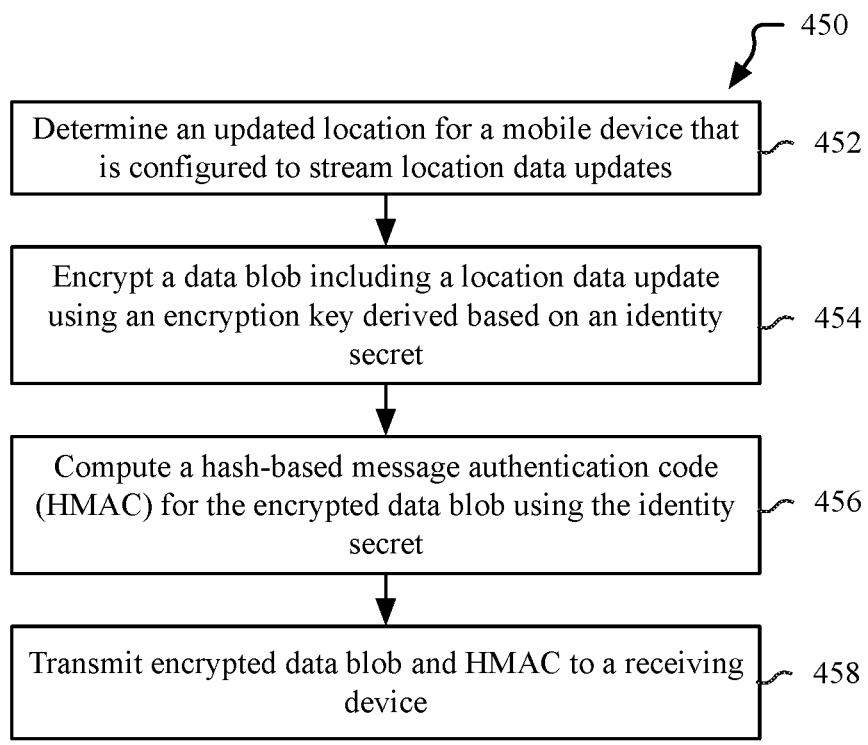
Figure 4D:
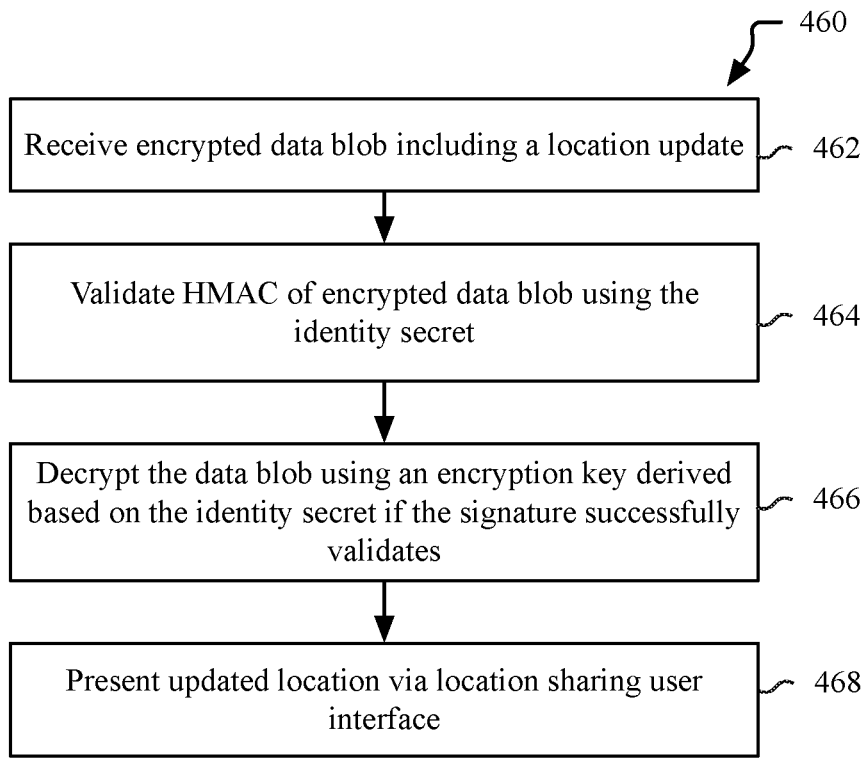

FIG. 4A-4D illustrate systems and methods to enable secure streaming of location data between devices, according to embodiments. FIG. 4A illustrates a storage container 402 of a storage system 400 used to store identity data used to enable secure location streaming. FIG. 4B illustrates the storage container 402 when configured to store identity records for use in secure location streaming. FIG. 4C illustrates a method 450 to send an encrypted location update. FIG. 4D illustrates a method 460 to decrypt a location update data stream and display the updated location. The storage container 402 can be, for example, one of container 316 or container 318 on the remote storage location 308 of FIG. 3 and can be associated with a cloud datastore 213 as in FIG. 2. The storage container 402 can be an account specific container that contains configuration and/or identity data and metadata for the account to which the storage container 402 is associated.

As shown in FIG. 4A, the storage container 402 includes a shared database 404 and a private database 406, which are storage locations for shared and private data respectively. The shared database 404 includes data that has been shared with an account associated with the storage container. Such data can be encrypted using keys that are generated based on a secret that is shared between users with legitimate access to the share. Data written to the private database 406 is visible only to the user to which the private database 406 is associated unless that data is shared with other users. Data within the private database 406 that is shared with other users can be stored to a shared database 404 of those users.

Data in the private database 406 can be divided into one of multiple zones (e.g., zone 408, zone 409). Each zone is associated with a set of asymmetric encryption keys. The encryption keys can be different for each zone, such that access to each zone can be separately managed. In one embodiment, an Elliptic Curve Integrated Encryption Scheme (ECIES) is used in which each zone has an associated EC key pair. However, various asymmetric encryption techniques can be used to encrypt the zones and the encryption used for the zones is not limited to any particular encryption algorithm or technique. Data within the zones can be further encrypted using different encryption algorithms such as a variant of the advanced encryption standard (AES) such as AES-256.

Each zone can include multiple records. For example, zone 408 can include multiple records 410A-410N. In one embodiment each record 410A-410N can store a set of fields, where each field can contain various types of data, such as strings, numbers, dates, locations, references, or files). Zone 409 can store records in a manner similar to zone 408. One of zone 408 or zone 409 can be configured store identity records that defines a location streaming relationship (e.g., a friendship) between online accounts.

Data in the shared database 404 can be arranged similarly to private database 406. For example, the shared database 404 can include one or more zones (e.g., zone 411). The shared database 404 can also include one or more shares (e.g., share 412) that can be made accessible to users associated with other online accounts. One or more records (e.g., record 414) can be stored within the share 412. In one embodiment, the zone 411, share 412, and record 414 can be separately encrypted.

As shown in FIG. 4B, the private database 406 and shared database 404 can be configured to include identities zones 420, 430 that store the identity records. The private database 406 can include an identities zone 420, which stores an identity record 422. The private database 406 can store one or more identity records per handle. In one embodiment, the identity record 422 includes a type, toHandle, fromHandle, and secret. The type specifies the type of identity record, as different types of identities can be used for different services. In embodiments described herein, the type can specify a location streaming service facilitated through an online account, such as the Find My Friends service provided through iCloud, where Find My Friends and iCloud are each provided by Apple Inc. of Cupertino Calif. Identity records for different services will specify a different type. The toHandle and fromHandle specify the handles and the data flow direction for the location data stream. Location data within a location data stream will be streamed to a device associated with the toHandle from the device associated with the fromHandle. The device associated with the fromHandle can be, in one embodiment, a device that is designated as the indicator of the location for a specific user. In one embodiment, any device associated with the toHandle can receive a location data stream. In other embodiments, real-time location can be streamed only to a specific device or devices associated with the toHandle.

In one embodiment the secret is a secret key that can be used to encrypt and decrypt data within the location data stream. In one embodiment the secret is a secret key that is used to deterministically derive other keys that are then used to encrypt or decrypt the location data stream. The identity record 422 can be encrypted using one or more of a variety of encryption techniques, which enables the record to be securely shared with other users. The identity record 422 can be encrypted using a symmetric or asymmetric encryption scheme that differs from the encryption scheme that is based on the secret, with keys that are based upon a previously established relationship between the user accounts, or a separately established keypair or shared secret exchanged between the user accounts. The secret within the identity record 422 can be rolled to a new secret by updating the value of the secret within the record. Users that are subscribed to the share for the identity record 422 will be notified of the update to the identity record 422 and can retrieve the new secret.

The shared database 404 can additionally include an identities zone 430 that includes a share 431. The share 431 is a container that can include a copy of an identity record 432 that has been shared with a user. In one embodiment, the shared database 404 includes all identities being shared to an associated account, including identities for other services, such as messaging services. Identities for other services may be stored in different shares, with the share 431 of FIG. 4B being used to store the set of identities used for location data streaming. The share 431 can be encrypted using a key derived from key material generated by the originator of the share. This key material can be sent over an encrypted data channel to subscribers to the share. The key material can then be used as a master key from which other keys are derived that can be used to encrypt and decrypt the share.

The share 431 can also store additional information that is intended to be accessible only to subscribers to the share and not accessible to third parties, including the cloud service provider. For example, a location sharing user can periodically store persisted location data 433, such as a periodic update to the device location, to the share 431. The persisted location data 433 can be encrypted and retained for a pre-determined or configurable time. Users associated with other online accounts that have access to that user's location will be able to view information such as a last known location for a user, even if the user's device does not have network access. For example, if a user boards a flight and places their mobile device into telephone mode, the user will not be able to be located. However, friends that are authorized to view the user's location may be able to see the airport as the user's last known location. Other information can be stored in the persisted location data 433, such as configured geofence data for a location sharing user.

As shown in FIG. 4C, method 450 configures a location streaming device to send an encrypted location update. Method 450 includes for the streaming device to determine an updated location for the mobile device (block 452). The updated location can be determined via one or more location determination systems that make use of satellite and/or terrestrial location determination techniques. The satellite positioning service includes, for example, use of a global positioning system receiver. The terrestrial positioning system can use RF signals received from wireless base stations, such as Wi-Fi access points or cell tower transmitters of a cellular telephone network.

Method 450 additionally includes for the streaming device to encrypt a data blob including a location data update using an encryption key derived based on an identity secret (block 454). The data blob is a collection of text or binary data, such as one or more location updates, that are combined into a single object. The data blob can also include configuration information to configure various aspects of location sharing. The data blob can also include metadata such as a movement state associated with the location updates. In one embodiment the movement state can include a movement profile detected by the transmitting device. The movement state can be, but is not limited to walking, running, cycling, driving, mass transit, or other movement states. In one embodiment, the movement state can be a meta-state that can be one of multiple states. For example, the driving or mass transit states can be combined into a meta-state and the location sharing UI can determine the actual state based on map data that corresponds with the location updates received from the streaming device.

The data blob can be encrypted using a variety of encryption algorithms including, but not limited to AES-256. The data blob can be encrypted using the selected encryption algorithm and the identity secret. The identity secret can be a secret key that can be used directly as an encryption key or can be used to derive another encryption key. The secret key or the derived key can then be used to encrypt the data blob using a selected encryption algorithm. The key derivation scheme can be pre-determined, or the sender and receiver devices can negotiate the key derivation scheme. In one embodiment the key derivation scheme can be adjusted when the secret key of the identity is rolled to a new secret key. The secret key can be regularly rolled to a new secret key, which can be relayed to friend accounts via the cloud storage share that is used to synchronize the identity record for the stream.

Method 450 additionally includes for the streaming device to compute a hash-based message authentication code (HMAC) for the encrypted data blob using the identity secret (block 456). The HMAC is generated by applying a cryptographic hash function to the encrypted data blob using the identity secret, or another key derived from the identity secret, as a cryptographic key. Method 450 additionally includes for the streaming device to transmit the encrypted data blob and HMAC to a receiving device 458. Data can be streamed to multiple receiving devices, which each receiving device being associated with a separate identity record. The separate identity records can have distinct identity secrets, where the distinct identity secrets are used to encrypt separate data blobs for transmission to separate receiving devices.

As shown in FIG. 4D, method 460 configures a receiving device to decrypt a location update data stream and display the updated location. Method 460 includes for the receiving device to receive an encrypted data blob including a location update (block 462). The receiving device can validate the HMAC of the encrypted data blob using the identity secret associated with the data stream (block 464) to ensure that the data blob has not been tampered with during transit. The receiving device can validate the HMAC by generating a new hash using the encrypted blob and the identity secret, or a key derived based on the identity secret, and comparing the generated hash with the received hash.

Method 460 additionally includes for the streaming device, if the HMAC validates successfully, to decrypt the data blob using the identity secret or encryption key derived based on the identity secret (block 466). The decryption can be performed in one embodiment, using a decryption key that is selected or generated based on a pre-determined or negotiated key derivation scheme. The receiving device can then present an updated location via a locating sharing user interface (468). Presenting the updated location can also include displaying an indicator of a motion state, such as whether the user is walking, running, cycling, driving, or using mass transit. In one embodiment, the determination between some states, such as driving or using mass transit, can be performed based on map data associated with the location of the streaming user.

To implement the techniques illustrated above, electronic messages can be passed within and between electronic devices. Those messages can confirm to an API specification that facilitates specific elements of functionality. An overview of API operations is provided below and with respect to FIG. 5. FIG. 6A through FIG. 7 illustrate messaging according to an exemplary API specification to establish a secure sharing friendship between online user accounts and to enable the streaming of location data between electronic devices associated with those accounts.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. An API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 5:
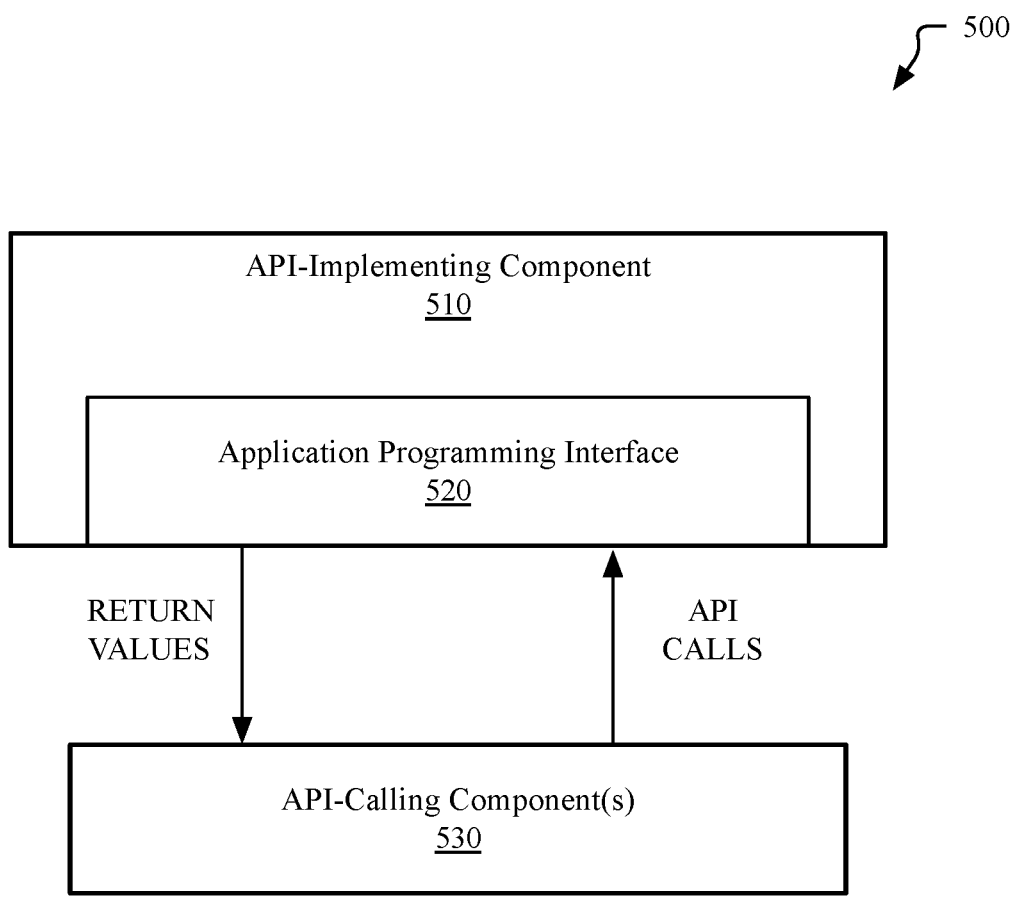
FIG. 5 is a block diagram illustrating an exemplary API architecture, which may be used in embodiments described herein.
Figure 6A:
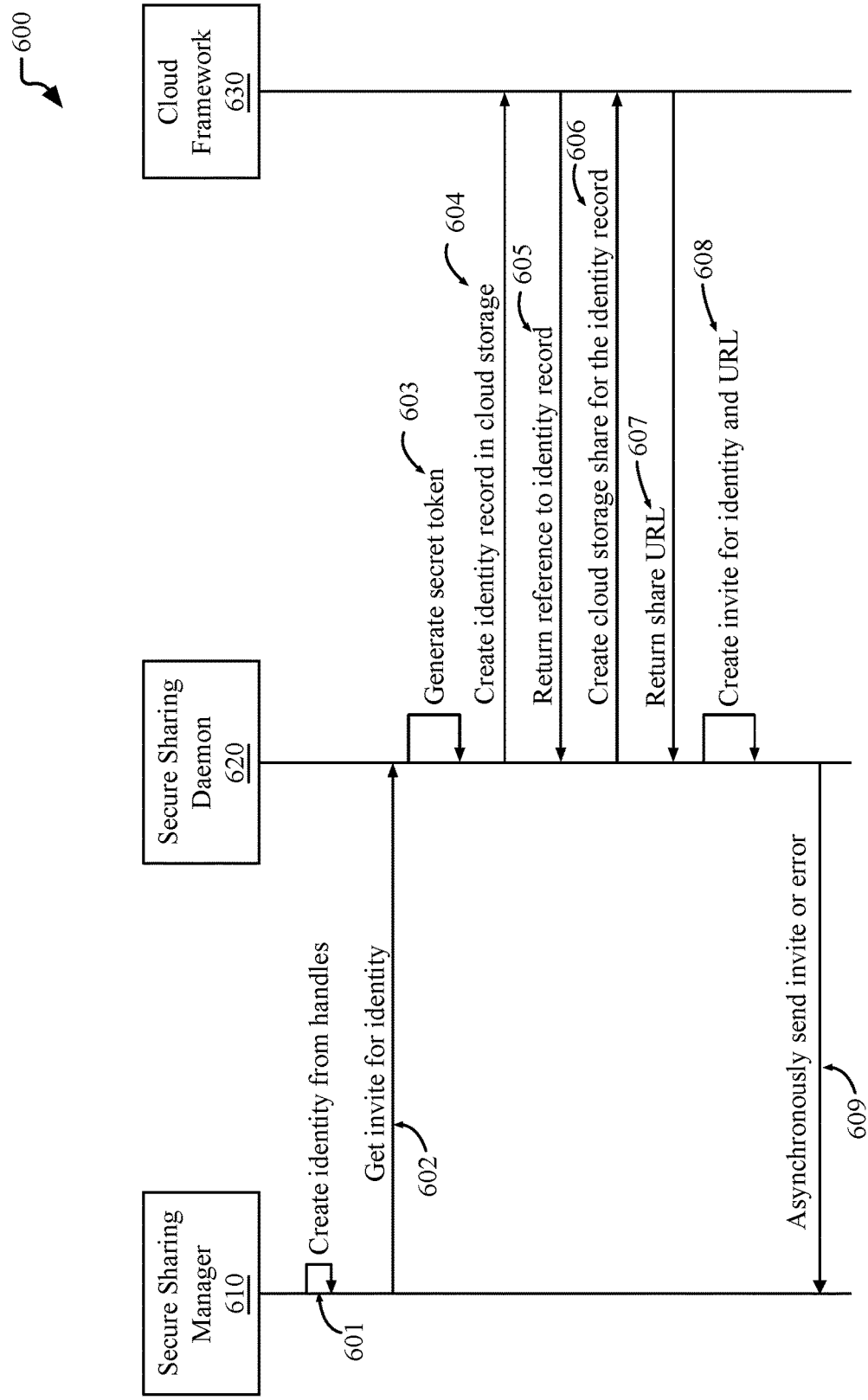
FIG. 6A-6B are sequence diagrams illustrating API message flows to generate and send a secure location sharing invite, according to embodiments.

FIG. 5 is a block diagram illustrating an exemplary API architecture, which may be used in some embodiments of the invention. As shown in FIG. 5, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 6B:
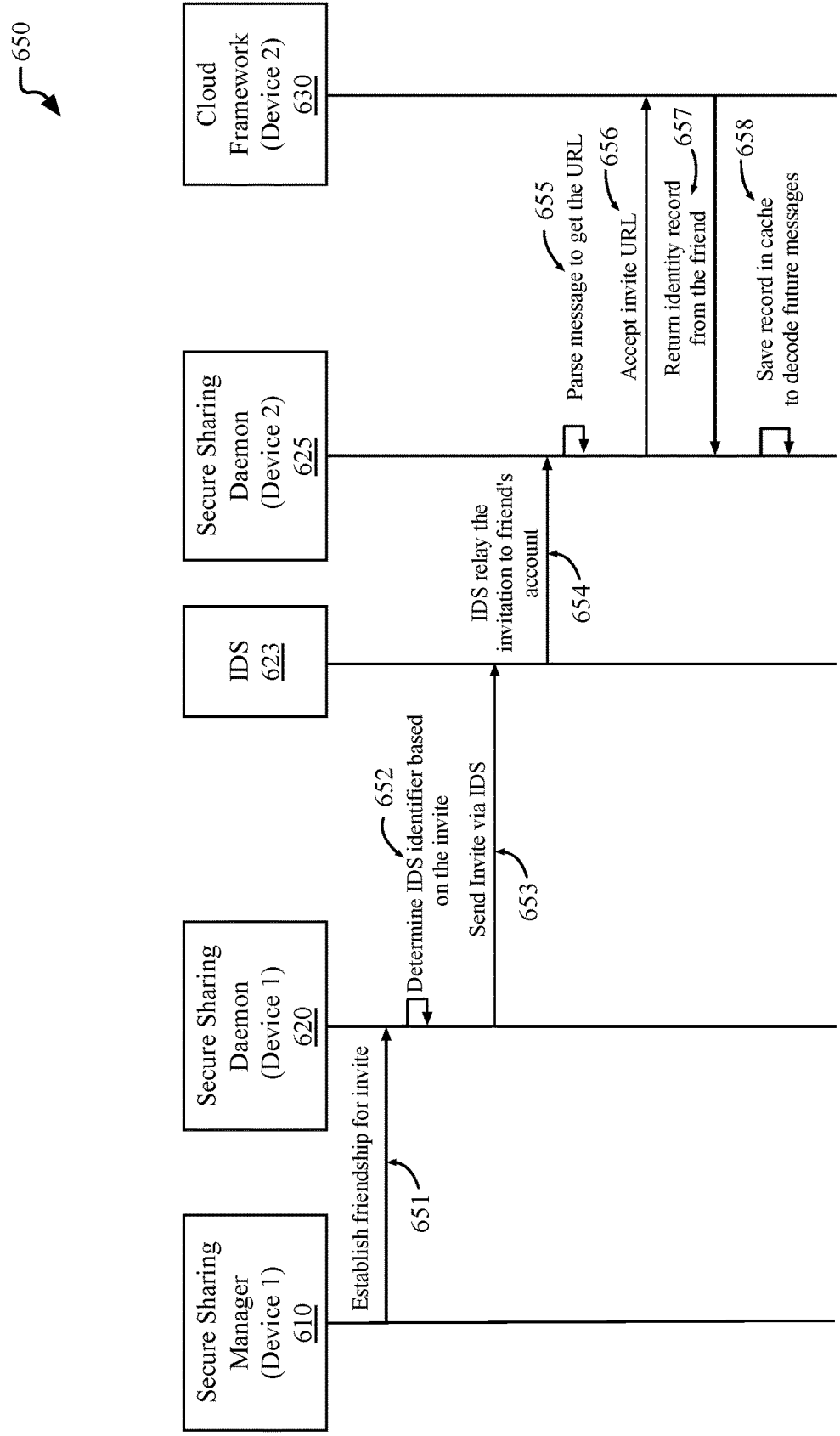
Figure 7:
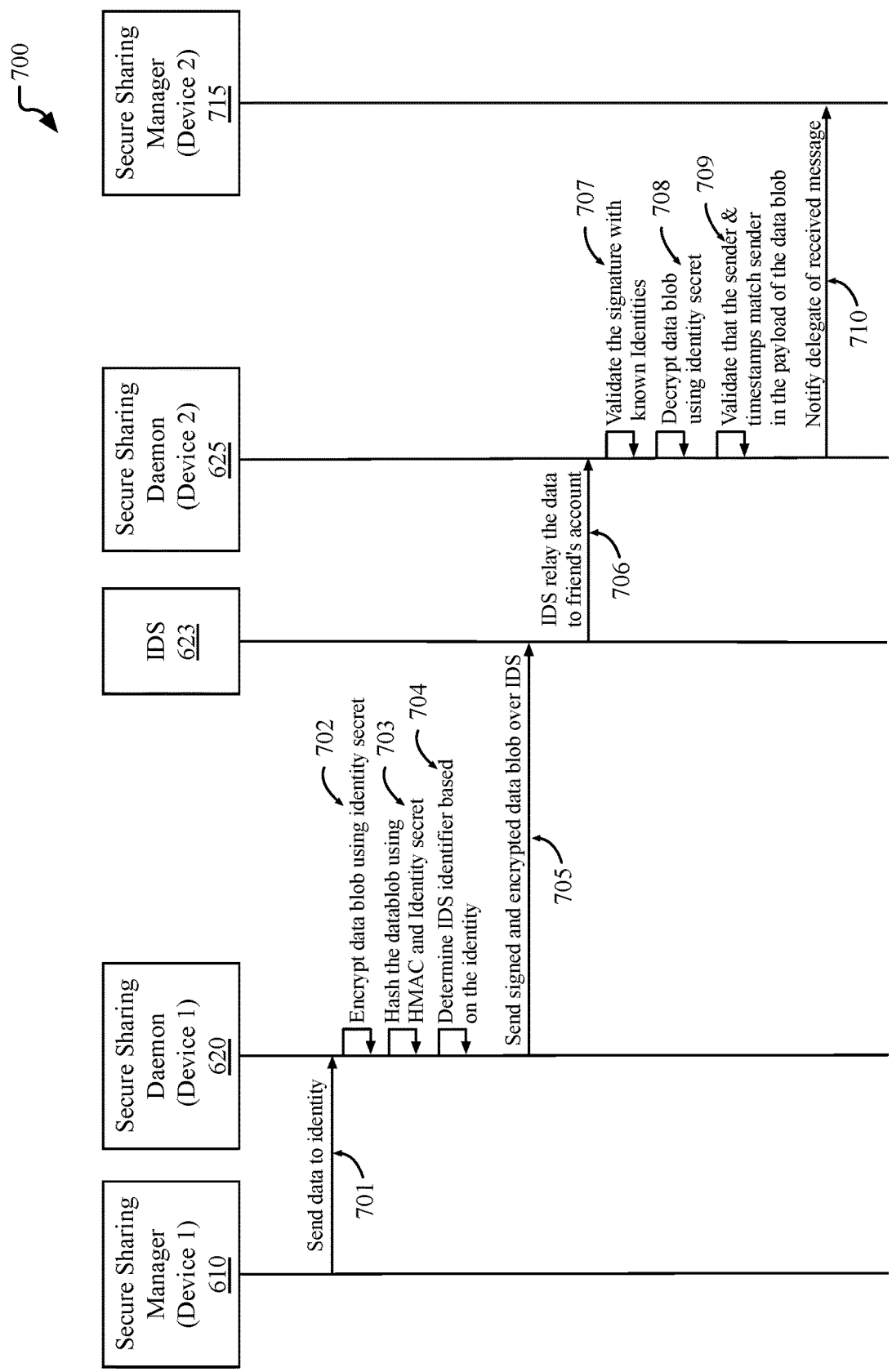
FIG. 7 is a sequence diagram illustrating an API message flow to send data through the identity channel.

FIG. 6A-6B are sequence diagrams illustrating API message flows 600, 650 to generate and send a secure location sharing invite, according to embodiments. In one embodiment, an electronic device associated with an online account, such as an online cloud services account, can execute program instructions that provide a secure sharing manager 610, secure sharing daemon 620, and a cloud framework 630. The electronic device can communicate with a system for providing identity services (IDS) 623 to locate and communicate with other electronic devices. In one embodiment the IDS system 623 includes the identity server 203 of FIG. 2A.

As shown in FIG. 6A, message flow 600 to generate a secure location sharing invite includes for the secure sharing manager 610 to create an identity from handles (e.g., toHandle, fromHandle) associated with a secure data stream (601). The secure sharing manager can then send a message to the secure sharing daemon 620 to get an invite for the identity (602). The secure sharing daemon 620 can generate a secret token (603) and send a message to the cloud framework to create an identity record within cloud storage (604). The cloud framework 630 can return a reference to identity record (605), which the secure sharing daemon 620 can use request the cloud framework 630 to create a cloud storage share for the identity record (606). The cloud framework 630 can then return a uniform resource locator (URL) to the cloud storage share for the identity record (607). The URL includes can include a locator or identifier for the share within the cloud storage system. In one embodiment the URL additionally includes metadata and cryptographic material that can be used to secure the share. The secure sharing daemon 620 can then create an invite for the identity and the URL (608). The secure sharing daemon 620 can then asynchronously send (609) the invite to the secure sharing manager 610. The secure sharing daemon 620 can alternately send an error if a failure occurred while processing the request to get the invite for the identity (602).

As shown in FIG. 6B, message flow 650 to send the secure location sharing invite includes for the secure sharing manager 610, which is the secure sharing manager on a first device, to send a message (651) to establish a friendship for the invite. The friendship establishes a trust relationship between the accounts that allows secure data to be shared between the accounts. The secure sharing daemon 620 of the first device can then determine an identity server (IDS) identifier to use to send the invite based on data included in the invite (652). The IDS identifier can be determined, for example, based on a handle associated with the invite. The secure sharing daemon 620 can then send the invite via IDS (653), which send the message using the IDS system 623 as a channel. The IDS system 623 can perform an IDS relay (654) to send the invitation to the friend's account via one of multiple available communication channels. The secure sharing daemon 625 on a second device that is associated with the user account of the friend can receive the invitation message and parse (655) the message to get a URL to the cloud storage share. In one embodiment, the URL additionally includes key material that the second device can use to access the encrypted share, or that the second device can use to derive keys that can be used to access the encrypted share. The secure sharing daemon 625 can send a message (656) to the cloud framework 630 on the second device to accept the invite URL. Once acceptance of the invite URL is sent to and processed by the cloud framework 630, a subscription via the cloud storage system of the cloud framework is established between the friends, allowing the second device to securely access shared data. In one embodiment, the shared data can be accessed using cryptographic keys that are generated based on data sent with the URL. Using the access to the share provided by the subscription, the cloud framework 630 of the second device can then return the identity record received from the friend at the first device (657). The identity record is then saved (658) in a cache by the secure sharing daemon 625 of the second device.

The shared data is encrypted using keys that are not retained by the cloud service provider. Private keys for the share are generated by the cloud service provider upon creation of the share and provided to the creator of the share. The generated keys for the share are then discarded by the cloud service provider.

If either user were to terminate the friendship that enables the cloud services share, the identity record will no longer be shared. Additionally, a user can maintain the friendship, but delete the identity that stores the data that is used to establish the secure location data stream, which removes the ability to establish the stream. Additionally, while an IDS relay is illustrated as being used to send the invitation to the friend's account, if the first device and the second device were near each other, the invitation can be sent directly between devices using, for example, a wireless radio protocol such as Bluetooth of Near Field Communication (NFC). Direct communication can also be performed when the devices are attached to the same local area network, such as the same Wi-Fi network. In one embodiment, the invitation can be accepted via the use of a common keycode, key phrase, or password that can be input by the user that accepts the share. In one embodiment, where an invite is accepted via an IDS relay, a reinforced relationship can be established via device to device communication when the devices are close to each other. For example, a set of keys can be established and exchanged using short-range wireless communication.

FIG. 7 is a sequence diagram illustrating an API message flow 700 to send data through the identity channel. In one embodiment, a message can be sent from a first friend at a first device to a second friend at the second device via an identity server relay. The secure sharing manager 610 on the first device can send a message to the secure sharing daemon 620 on the first device to cause data to be sent to an identity (701). When data is sent to an identity, a data blob containing data to be transmitted can be sent via the IDS system 623 using the handles specified by the identity.

The secure sharing daemon 620 on the first device can encrypt a data blob containing the data to be sent to the identity (702). The secure sharing daemon 620 can hash the data blob using the HMAC algorithm and the identity secret (703). The daemon can then determine the IDS identifier to which the data will be sent based on the toHandle stored in the identity (704). The secure sharing daemon 620 on the first device can then send the encrypted data blob, which is signed with the HMAC, to the identity server 203 (705). The IDS system 623 can relay the data to the friends account (706), which can be received at the second device. The secure sharing daemon 625 on the second device can validate the signature of the encrypted data blob with known identities (707), which compares the signature of the encrypted data blob with a signature generated based on the identity secret that contains the data that enables the data stream. If the signature validates correctly, the secure sharing daemon 625 on the second device can decrypt the data blob using the identity secret (708). The secure sharing daemon 625 can additionally validate that the sender and timestamps specified for the IDS message matches the sender and timestamp within the payload of the data blob (709). If the sender and timestamps validate correctly, the secure sharing daemon 625 of the second device can send a message to the secure sharing manager 715 of the second device to notify a delegate of the received message (710).

In various embodiments, the data blob that is sent through the IDS system 623 can contain a variety of different data. For example, the data blob can contain a request to initiate a peer to peer data stream from the second device to the first device. The data blob can contain one or more tokens that allow the second device to locate and connect the first device on a wide area network. Additionally, the first device can provide information to enable traversal of a network address translation (NAT) system for the network to which the first device is attached. The data blob can also contain a keepalive message to maintain the data stream. In one embodiment, a peer-to-peer location data stream from the second device to the first device may time out after a period of time unless a periodic keepalive message is sent by the first device. The data blob can also contain a request to stop transmitting data, for example when the first device is no longer viewing the position associated with the second device. The data blob can also contain information to configure various aspects of the location sharing relationship. In one embodiment, a geofence can be sent from the first device to the second device, such that the second device will notify the first device when the detected location for the second device transitions into or out of the designated geofence.

Figure 8:
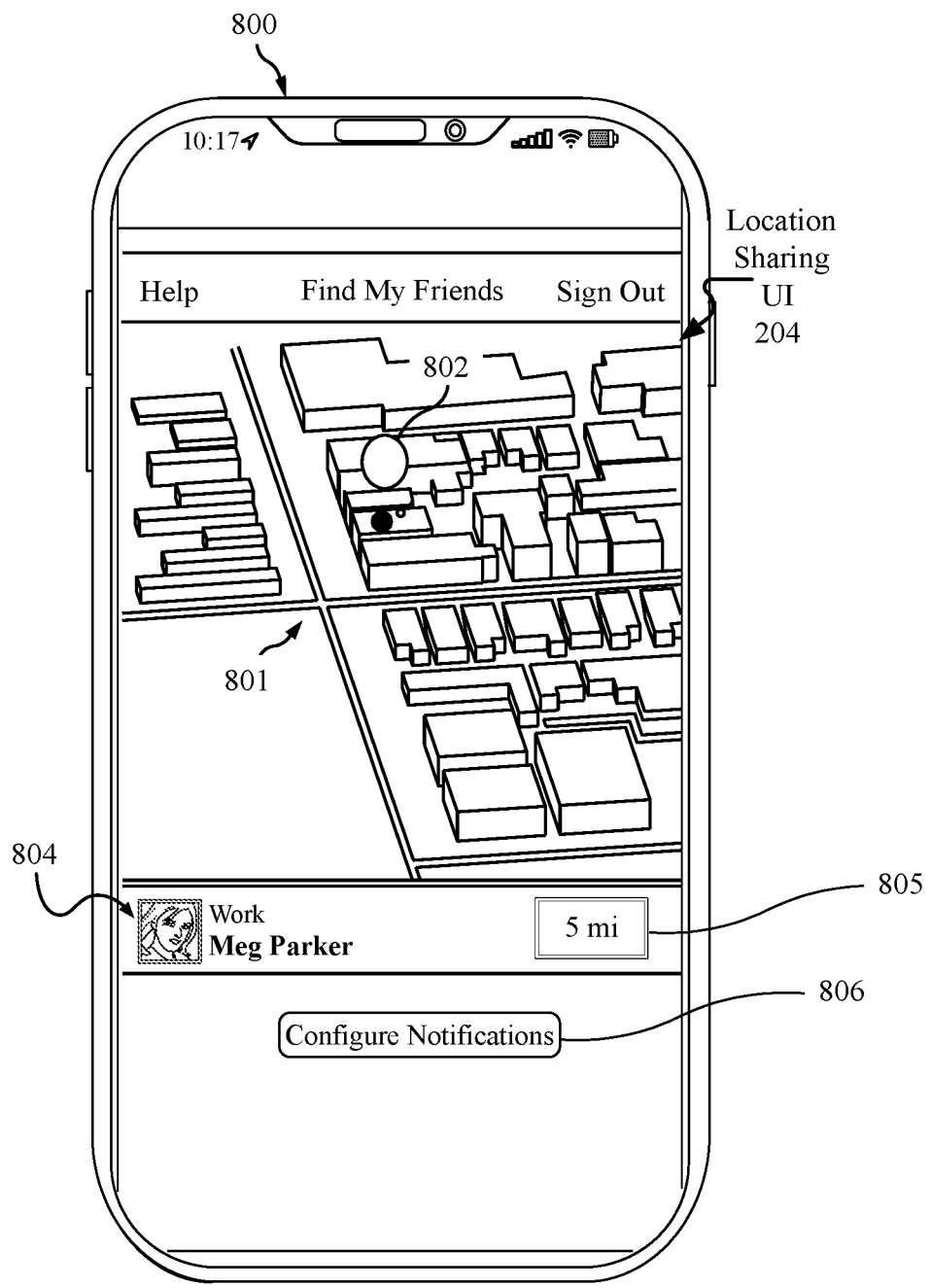
FIG. 8 illustrates an exemplary location sharing user interface, according to an embodiment.

FIG. 8 illustrates a location sharing UI 204, according to an embodiment. The location sharing UI 204 can be displayed on an electronic device 800, which can be a mobile device as described herein, although use of the location sharing UI 204 is not limited to mobile devices. Additionally, the specific UI elements illustrated for the location sharing UI 204 are exemplary and are not limited as to all embodiments. The location sharing UI 204 can display a map 801 and a marker 802, where the marker 802 can display a current location of a user. The location sharing UI 204 can also display UI element 804 that indicates the user whose location is shared on the map. In one embodiment the location sharing UI 204 can also display UI element 805, which shows a current distance between the electronic device 800 and the marker 802 for the user. In one embodiment, the marker 802, or UI element, can display a detected motion state of the user, such as whether the user is in an active or passive state, or whether the user is walking, running, cycling, driving, or using mass transit. In one embodiment, the determination between some states, such as driving or using mass transit, can be performed based comparing the user's location with data on the map 801, for example, to determine if a user's movement pattern, speed, or location history is consistent with a mass transit route.

In one embodiment, the location sharing UI also can display UI element 806, which can be a button or another selectable UI element that allows the configuration of notification associated with the user whose location is being shown. A configurable notification can be a geofence, which is a map region for which notifications should be sent for the selected user. The configured geofence can be transmitted to the device of the selected user and saved in an encrypted format. The user's device can then be configured to transmit a notification when the user enters or exits the configured geofence. In one embodiment the geofence data can be encrypted and written to data that is securely shared via the cloud datastore.

Figure 9:
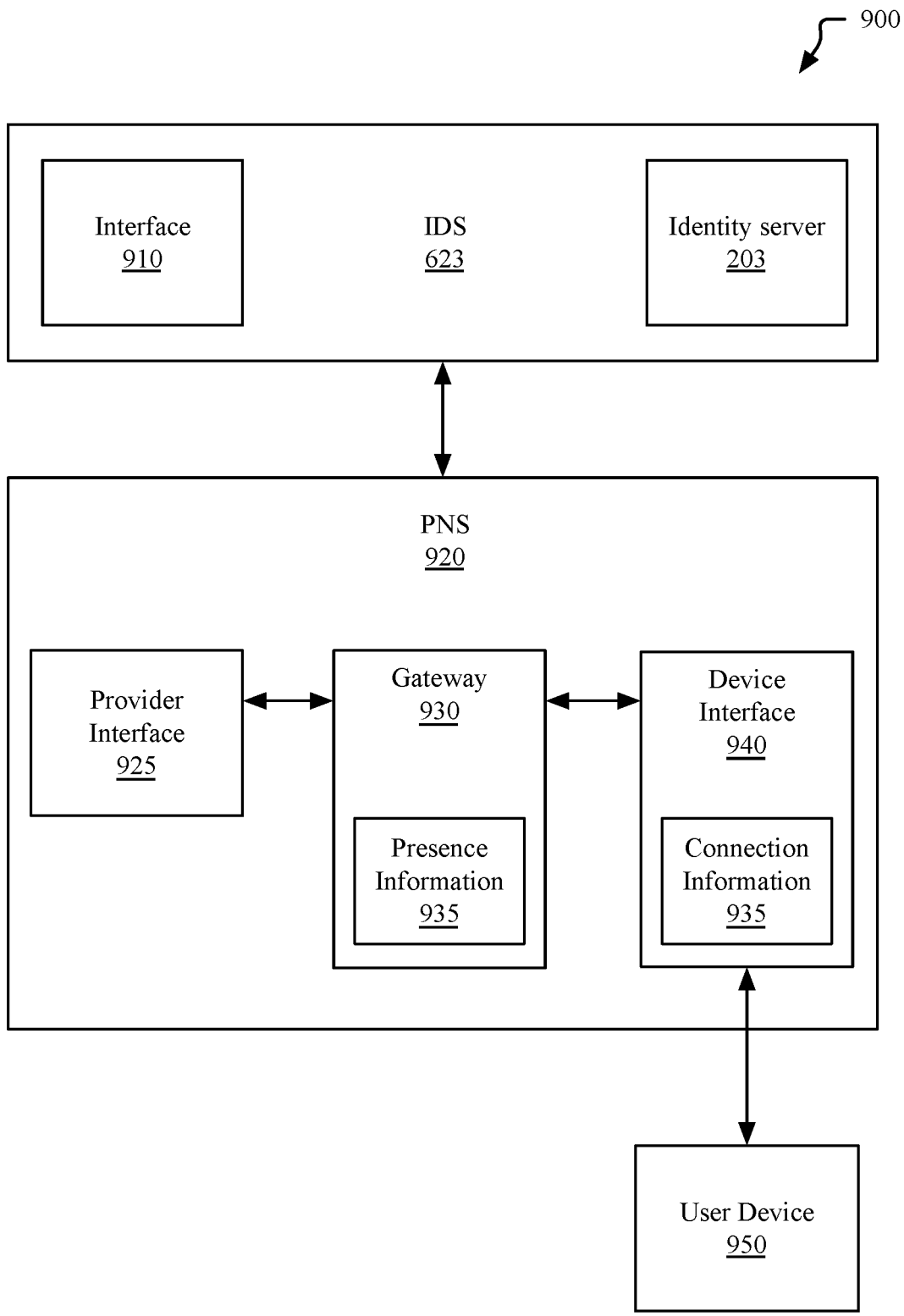
FIG. 9 is a block diagram of a system that provides push notification services according to various embodiments.

FIG. 9 is a block diagram of a system 900 that provides push notification services according to various embodiments. The system 900 may be implemented in various embodiments using a single server device or may include multiple networked server devices. The system 900 enables the forwarding of content (e.g., notification messages, phone/video calls, location data) between devices, for example, between providers and mobile devices, or between a sending device of one user and receiving devices of another user. In one embodiment the system 900 uses the IDS system 623 to enable a push notification service (PNS) 920 to send messages to a user device 950. The IDS system 623 includes an interface 910 and the identity server 203. The PNS 920 includes a provider interface 925, a gateway 930 having presence information 935, and a device interface 940 having connection information 945. The illustrated services can be implemented using hardware and/or software elements.

The IDS system 623 can be or included within an identity management infrastructure as described herein. The IDS system 623 can be implemented in various embodiments using a single server device or multiple networked server devices. The interface 910 of the IDS system 623 can enable an entity, such any electronic device described herein, to connect via a network to the IDS system 623 and make use of services provided by the IDS system 623. Interface 910 can include load balancing and other connection management logic that enables a large number of entities to communicate with the identity server 203.

In one embodiment, an entity sends information, such as an authentication certificate, that is received via interface 910 upon an initial connection to the IDS system 623 or to a service, resource, or application managed by the IDS system 623, such as the PNS 920. The identity server 203 can authenticate and authorize a device, user, or organization sending the information as a registered and authorized entity. One or more types of services can be authorized or provisioned for the device, user, or organization (e.g., call services, instant messaging services, chat services, notification services, location sharing services, etc.). To support a security model for the PNS 920, entities and their devices may be required to possess certain certificates, certificate authority (CA) certificates, or tokens.

In one embodiment, each provider of content uses a unique provider certificate and private cryptographic key for validating their connection with the PNS 920. This certificate can be provisioned by the identity server 203 and identify the provider and/or a particular topic published by the provider. In general, the topic is a bundle ID of a client application. The provider may optionally wish to validate the service, to which the provider is connected, using a public server certificate provided by the PNS 920. In various aspects, the provider uses the public server certificate passed to it by the identity server 203 when registering to authenticate the service to which the provider has connected.

The identity server 203 may also issue to each device, which desires to receive content, a unique private key and certificate that the device uses to authenticate itself to the identity server 203 and establish a connection to PNS 920. A device usually obtains a device certificate and key from identity server 203 during device activation and stores them in a keychain. The device also holds its particular device token, which it receives during the service connection process. Each client application that utilizes PNS 920 is responsible for delivering this token to its content provider.

The identity server 203 may store any necessary certificates, certificate authority (CA) certificates, and cryptographic keys (private and public) for validating connections and the identities of providers and devices. Once the entity is trusted, the system 900 allows the entity to utilize push notification services provided by PNS 920. The PNS 920 can be implemented in various embodiments using a single server device or multiple server devices. The entity may be a provider or other notification provider desiring to connect with the PNS 920 (e.g., via a network). As alluded to above, in one embodiment, provider interface 925 provides a high-speed, high-capacity interface allowing push notification providers to communicate with the PNS 920. Provider interface 925 may incorporate load balancing and other connection management techniques allowing entities to communicate with the PNS 920. Although provider interface 925 is shown as being linked to the gateway 930, the provider interface 925 may be incorporated into the gateway 930 or the device interface 940. As discussed above, a user device can be a provider of content in various embodiments as well as be a destination of content routed using the PNS 920.

The gateway 930 may be implemented in various embodiments using a single server device or may include multiple networked server devices. The gateway 930 can determine the destination of content (e.g., push messages) received via provider interface 925 or device interface 940. In various embodiments, the gateway 930 can determine a destination based on presence information 935. In one aspect, presence information 935 is maintained using a device's push token, or an equivalent identification token. Accordingly, when a push notification is received at gateway 930 directed to a particular push token, gateway 930 can perform a lookup to determine whether there is a TCP socket descriptor associated with that push token. The socket descriptor can provide the TCP socket information and other networking information needed to transmit the push notification. In various aspects, presence information 935 includes mappings between authenticated entities and their connections to the PNS 920. These connections can be utilized by the PNS 920 to deliver content, notifications, and the like, or to otherwise communicate with an entity. Each mapping may be indicative of at least one entity and at least one connection mechanism to that entity, such as a network socket connection or other connection identifier. For example, a mapping can identify a destination device by its device token or a provider by its provider identifier. Additional information may be included in each mapping in order to facilitate communication with the entity's device.

In some embodiments, in order to scale handling of connections from an increasing number of users, devices, and providers utilizing services of the PNS 920, device connections in presence information 935 (or the devices themselves) may be managed according to at least one grouping or logical partition called a zone. Functions performed by gateway 930 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 930 may be partitioned out to multiple servers to handle corresponding device connections (e.g., device interface 940).

In various embodiments, the gateway 930 is linked to a device interface 940. The device interface 940 provides an interface to communicate with the user device 950. The device interface 940 may incorporate load balancing and other connection management techniques allowing devices to communicate with the PNS 920. Although device interface 940 is shown as being linked to gateway 930, device interface 940 may be incorporated into gateway 930 or provider interface 925.

Device interface 940 allows presence information 935 to be generated when device interface 940 is connected to user device 950. User device 950 can assert its presence to the PNS 920 upon establishing a persistent connection. Device interface 940 then generates a device/connection mapping in connection information 945. Device interface 940 can back-propagate connection information 945 to gateway 930 allowing gateway 930 to generate a device/connection mapping in presence information 935. In one aspect, presence information 935 includes a device/courier mapping or link allowing gateway 930 to determine an appropriate courier that acts as device interface 940 connected to user device 950. The courier utilizes connection information 945 (including any device/connection mappings or links) allowing the courier to determine connection information specific to user device 950 that can be used to deliver content to user device 950. In another aspect, presence information 935 and connection information 945 may be substantially identical in that they include correspondences between a given device and its connection with the PNS 920.

In various embodiments, a device wishing to receive content via the PNS 920 sends authentication information either upon an initial connection with the device interface 940 or directly to the IDS 623. The identity server 203 can receive the authentication information either directly or indirectly and then authenticate and authorize the device or its associated user or organization as a registered and authorized entity. Once the device is trusted, the PNS 920 is informed and the PNS 920 thereafter manages any connections made between the device and the PNS 920 (such as with device interface 940 in connection information 945). Device information available at device interface 940 in connection information 945 can be periodically back-propagated to gateway 930 to generate or update presence information 935.

When the device initially connects with the PNS 920, the PNS 920 provisions the device. In various embodiments, a zone is provisioned for the device as alluded to above. Despite a particular zone assignment for each device, devices may lose their connection with device interface 940 for various reasons. For example, a connection might be lost due to loss of cellular signal, or wi-fi signal, loss of power, or because a mobile device has changed geographic locations, etc. In other aspects, a connection may be intermittent, as opposed to being persistent, to conserve power or achieve other efficiency metrics.

When user device 950 attempts to reconnect to the PNS 920, device can connect with any courier acting as device interface 940. In embodiments where device connections are assigned to at least one grouping or zone, device interface 940 may provision a connection with one or more servers of the gateway 930 that are assigned to handle the zone of a connecting device. For example, if device interface 940 is connected to the user device 950 that is assigned to zone 1, then the device interface 940 can provision a connection with one or more servers responsible for managing zone 1. Device interface 940 may then back-propagate device information for user device 950 to the one or more servers responsible for managing zone 1. In similar fashion, device interface 940 may make connections with servers of different zones to back-propagate specific device information for devices associated with those respective zones ensuring that no matter where or how user device 950 connects to the PNS 920, presence information 935 is up to date and available to determining how to route the content. In some embodiments, device interface 940 can be specific to a wireless carrier or interne service provider (ISP) allowing the PNS 920 to support the protocols or physical connections specific to multiple third-party entities.

According to one example, when the gateway 930 receives content from provider interface 925, the gateway 930 forwards the content received from provider interface 925 to the device interface 940 based on its mappings in presence information 935. The device interface 940 can deliver the content received from gateway 930 to user device 950 for which information about a persistent connection is maintained in connection information 945.

Upon receiving content from gateway 930, device interface 940 can perform a lookup or otherwise consult its device connections in connection information 945 and send the content received from gateway 930 to the appropriate device, for example, over the persistent connection associated with user device 950. In one aspect, the device interface 940 inspects the device token associated with the content to be delivered and determines whether a match is found between the device token and the connections that device interface 940 manages in connection information 945. The device interface 940 can deliver the content using the connection established by the device having the given device token.

In one example of operation, user device 950 subscribes to a particular application managed by a provider, such as a location sharing manager, and desires to receive notification messages for that application via the PNS 920. Thus, user device 950 calls the provider either directly via a communications network or utilizing the PNS 920 and transmits its device token to the provider. The device token or its transmission may include not only a device's identification information but may include an encrypted combination of a device's UID and its zone identifier allowing the PNS 920 to provision connection information for the device according to the appropriate resources allocated to the zone.

When the provider sends a notification message to the particular application on user device 950, the provider connects to the PNS 920 using provider interface 925 and sends the message to gateway 930. Even if user device 950 is associated with a particular zone, the provider does not need to connect to any particular gateway of the PNS 920 to successfully push a notification message to user device 950.

For example, if the gateway 930 receives content from provider interface 925 and the content has a device token, the gateway 930 will look at the token and either route the message to an appropriate server of the PNS 920 (which may route the message to device interface 940 or another courier of PNS 920) or route the message directly to the device interface 940.

If the gateway 930 is the designated gateway, the gateway 930 sends/forwards the message to the device interface 940 based on its device/courier mapping in the presence information 935, in some embodiments. The device interface 940 is then able to lookup its connections in the connection information 945 and send the message to the device over the persistent connection established by the device with device interface 940. In summary, in cases where the PNS 920 receives a message having a particular destination, a gateway of the PNS 920 forwards that message directly to an appropriate courier of the PNS 920 using a device/courier mapping that was established when a device connects to the PNS 920. In further embodiments, gateway 930 can send/forward the message directly to user device 950 based on its device/connection mapping in presence information 935. Gateway 930 can generate this mapping information from various sources to each of which a device has established a connection.

Figure 10:
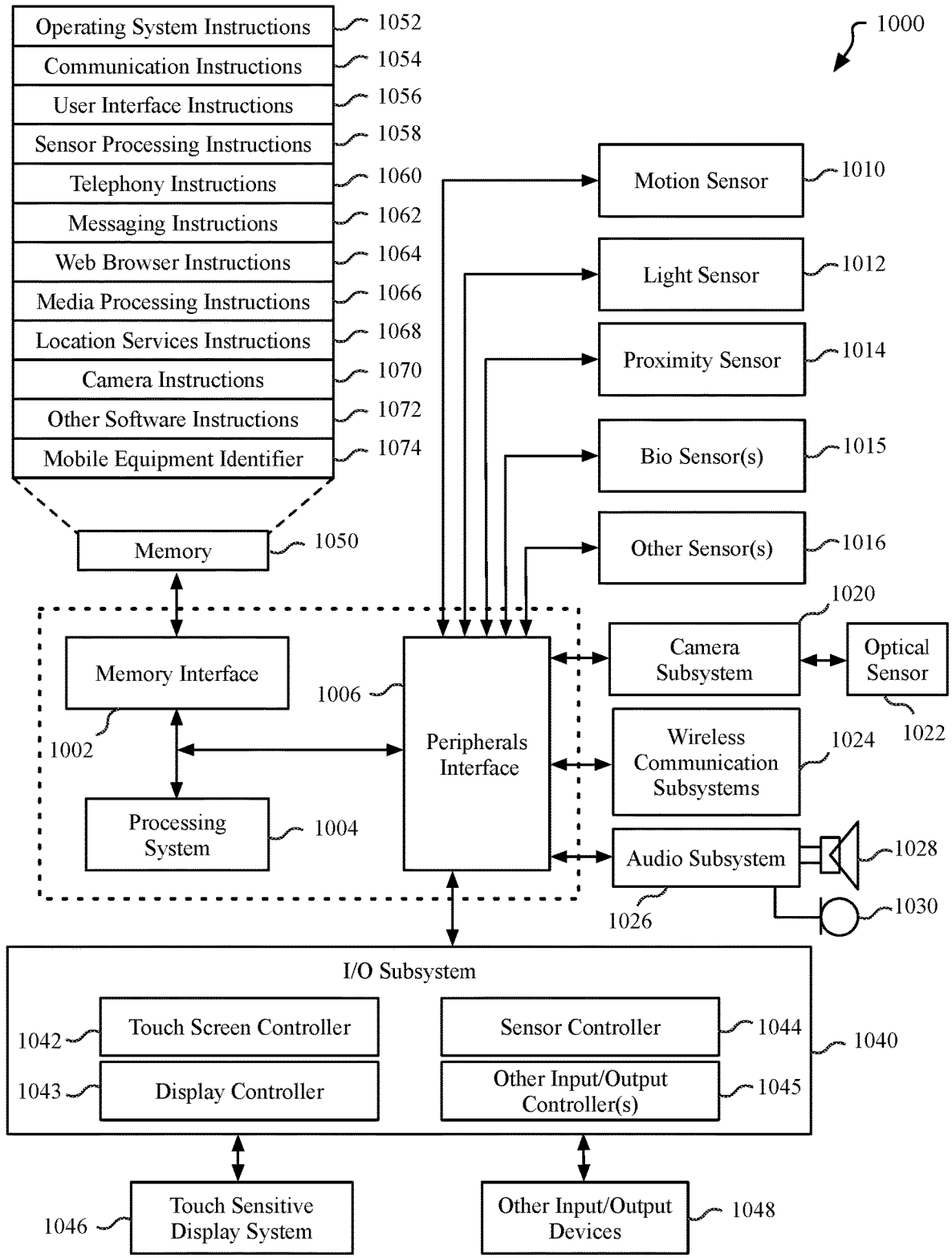
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
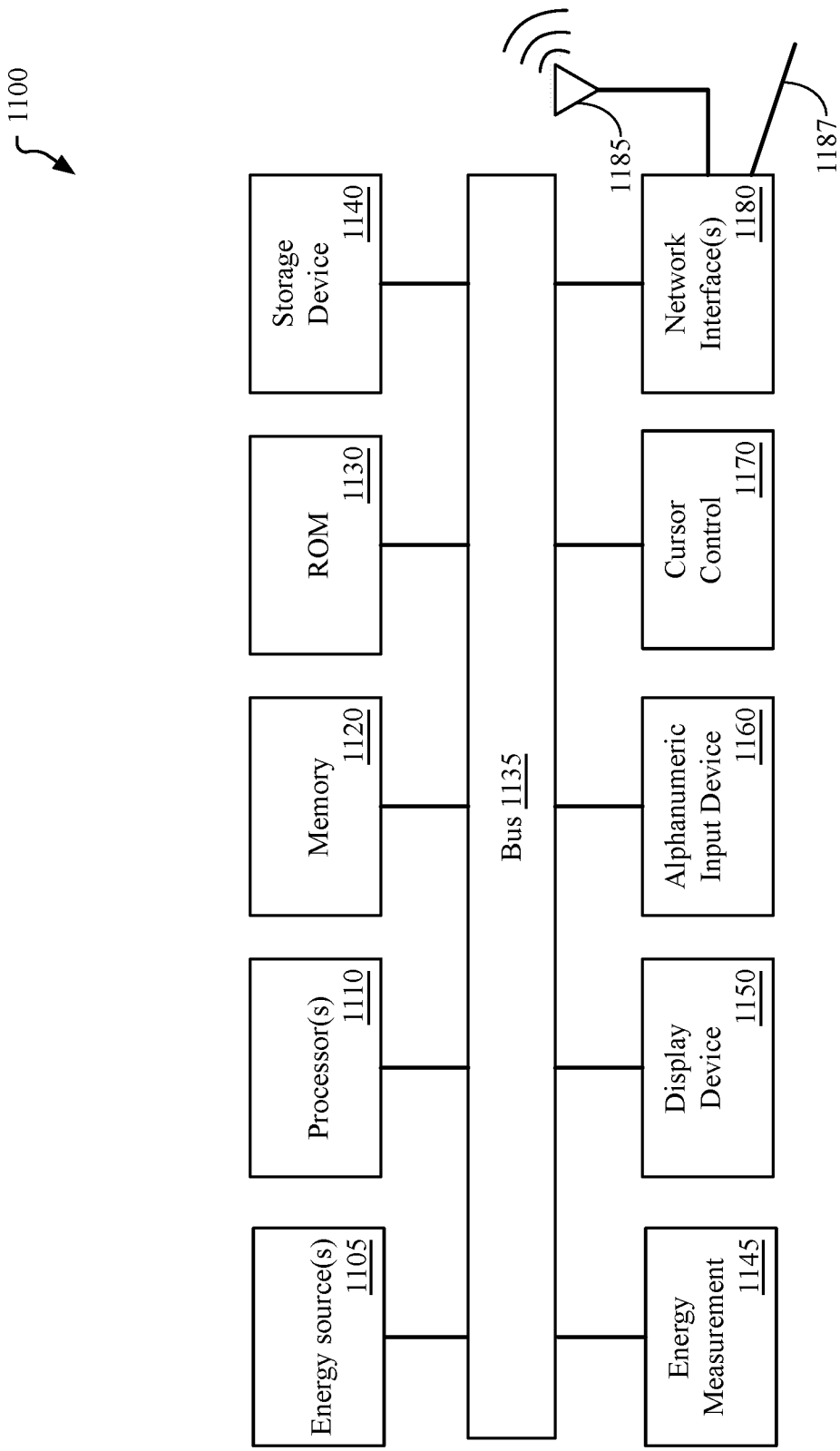
FIG. 11 is a block diagram of a computing system, according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120 in the form of random-access memory (RAM) or other dynamic storage device coupled to the bus 1135. The memory 1120 may store information and instructions that may be executed by processor(s) 1110. The memory 1120 may also be main memory that is used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for a particular type of microprocessor. Accordingly, in an embodiment, the system can provide a hardware-accelerated mechanism for performing cryptographic operations to improve the speed of performing the functions described herein using these instruction sets.

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod touch® devices from Apple Computer, Inc. of Cupertino, Calif.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A non-transitory machine-readable medium storing instructions which, when executed, cause one or more processors of a data processing system to perform operations comprising:
    sending a request to create a record to specify a location streaming relationship between a first device registered with a first user account and a second device registered with a second online account, the record including a secret key;
    sending a request for storage of the record to an online datastore associated with the first user account;
    sending a request to share an encrypted version of the record via the online datastore, the encrypted version of the record shared with the second online account;
    generating a set of keys at the first device, the set of keys generated based on the secret key;
    sending a message from the first device to the second device to establish a location data stream, the location data stream encrypted by the second device using one or more keys in the set of keys; and
    displaying a location for the second device received from the location data stream on a graphical interface of the first device, wherein the location data stream is decrypted using the one or more keys.

2. The non-transitory machine-readable medium as in claim 1, the operations additionally comprising:
    establishing a share for the record via the online datastore includes-creating an invite to share the record and sending the invite to the second online account.

3. The non-transitory machine-readable medium as in claim 2, the operations additionally comprising sending the invite to the second user account via an identity server, the identity server to relay the invite to the second device, wherein the second user account is identified via a handle that identifies the online account.

4. The non-transitory machine-readable medium as in claim 3, wherein the handle is an e-mail address or a telephone number associated with the second online account.

5. The non-transitory machine-readable medium as in claim 3, wherein the invite includes a uniform resource locator (URL) that identifies the share for the record via the online datastore.

6. The non-transitory machine-readable medium as in claim 5, wherein the share is encrypted on the online datastore and the URL includes cryptographic material to derive an encryption key for the share.

7. The non-transitory machine-readable medium as in claim 1, the operations additionally comprising receiving a motion status associated with the second device and displaying the motion status on the graphical interface of the first device, the motion status indicating an active or passive state for a user associated with the second device.

8. The non-transitory machine-readable medium as in claim 7, wherein the motion status additionally indicates a walking, running, or driving state for the user associated with the second device.

9. The non-transitory machine-readable medium as in claim 1, wherein the location data stream is established by the second device via connection information on a server, the connection information to map the first device to connection information for the first device.

10. An electronic device comprising:
    a wireless radio system coupled to a bus;
    a memory to store instructions; and
    one or more processors to execute the instructions, wherein the instructions cause the one or more processors to:
        decrypt and read an encrypted record including information to establish a network connection with a receiving electronic device, the record read from a cache of an online data store, wherein the record includes a secret key to derive keys for encrypting and decrypting a data stream by the receiving electronic device;
        establish the data stream with a receiving electronic device using the information, the data stream established via the wireless radio system;
        determine a location for the electronic device via a location determination service; and
        transmit, to the receiving electronic device, the location for the electronic device via the data stream, the location encrypted using a key derived from the secret key,
    wherein the receiving electronic device decrypts the location using the key.

11. The electronic device as in claim 10, the electronic device additionally comprising a global positioning system receiver and the location determination service is to determine a location via a satellite positioning service based on signals received via the global positioning system receiver or based on signals received via the wireless radio system.

12. The electronic device as in claim 10, the one or more processors further to:
    receive a request to share a location of the electronic device with the receiving electronic device;
    in response to acceptance of the request, receive a master key;
    derive a share key based on the master key;
    retrieve the encrypted record via the online data store; and
    store the encrypted record to the cache of the online data store, wherein the encrypted record is decrypted using the share key.

13. The electronic device as in claim 12, the one or more processors further to:
  determine an updated location for the electronic device;
  encrypt the updated location with the key derived from the secret key; and
  transmit the updated location for the electronic device to the receiving electronic device via the data stream.

14. The electronic device as in claim 13, the one or more processors further to:
  receive a notification of an update of the secret key;
  retrieve an update for the encrypted record via the online data store;
  store the update for the encrypted record to the cache of the online data store;
  decrypt the encrypted record and read an updated secret key, the encrypted record decrypted using the share key;
  derive a new key based on the updated secret key; and
  encrypt subsequent locations using the new key.

15. A data processing system comprising:
  a non-transitory machine-readable medium to store instructions;
  one or more processors to execute the instructions, wherein the instructions cause the one or more processors to perform operations comprising:
    sending a request to create a record to specify a location streaming relationship between a first device registered with a first user account and a second device registered with a second online account, the record including a secret key;
    sending a request for storage of the record to an online datastore associated with the first user account;
    sending a request to share an encrypted version of the record via the online datastore, the encrypted version of the record shared with the second online account;
    generating a set of keys at the first device, the set of keys generated based on the secret key;
    sending a message from the first device to the second device to establish a location data stream, the location data stream encrypted by the second device using one or more keys in the set of keys; and
    displaying a location for the second device received from the location data stream on a graphical interface of the first device, wherein the location data stream is decrypted using the one or more keys.

16. The data processing system as in claim 15, the operations additionally comprising:
  establishing the share for the record via the online datastore includes creating an invite to share the record and sending the invite to the second online account.

17. The data processing system as in claim 16, the operations additionally comprising sending the invite to the second user account via an identity server, the identity server to relay the invite to the second device, wherein:
  the second user account is identified via a handle that identifies the online account;
  the handle is an e-mail address or a telephone number associated with the second online account;
  the invite includes a uniform resource locator (URL) that identifies the share for the record via the online datastore; and
  the share is encrypted on the online datastore and the URL includes cryptographic material to derive an encryption key for the share.

18. The data processing system as in claim 15, the operations additionally comprising receiving a motion status associated with the second device and displaying the motion status on the graphical interface of the first device, the motion status indicating an active or passive state for a user associated with the second device.

19. The data processing system as in claim 18, wherein the motion status additionally indicates a walking, running, or driving state for the user associated with the second device.

20. The data processing system as in claim 15, wherein the location data stream is established by the second device via connection information on a server, the connection information to map the first device to connection information for the first device.

* * * * *